United States Patent
Day

[15] 3,700,263
[45] Oct. 24, 1972

[54] HITCH

[72] Inventor: Leon E. Day, Memphis, Tenn.

[73] Assignees: Richard Routon; James B. Sellers, Memphis, Tenn. ; part interest to each

[22] Filed: April 27, 1971

[21] Appl. No.: 137,762

[52] U.S. Cl.................280/415 A, 280/504, 280/511
[51] Int. Cl. .................................................B60d 1/06
[58] Field of Search....................................280/415 A

[56] References Cited

UNITED STATES PATENTS 2,940,775   6/1960   Farrow ...................280/415 A
3,066,952   12/1962   Price.......................280/415 A

FOREIGN PATENTS OR APPLICATIONS 302,203   12/1917   Germany...............280/415 A

*Primary Examiner*—Leo Friaglia
*Attorney*—John R. Walker, III

[57] ABSTRACT

A hitch for hitching a towed device, such as a trailer, to a towing vehicle such as a pick-up truck, automobile, tractor or the like. The hitch includes a swivel assembly, a ball and pin assembly removably held in the swivel assembly and adapted to be engaged by a socket mounted on a trailer tongue, and a holder retaining a movable portion of the swivel assembly in a fixed position. The ball and pin assembly and the holder are removable to convert the hitch so that it is usable with a tongue having a pin type of arrangement.

5 Claims, 4 Drawing Figures

PATENTED OCT 24 1972

3,700,263

INVENTOR.
LEON E. DAY

BY John R. Walker, III
Attorney

HITCH

BACKGROUND OF THE INVENTION

1. Field of the Invention

This invention relates to a hitch for hitching a towed device to a towing vehicle.

2. Description of the Prior Art

There are, in general, two widely used types of hitches for hitching a towed device to a towing vehicle. First, there is a type which will be referred to herein as the pin type and which is commonly used with farm implements, such as spreaders, cotton wagons, disc harrows, planters and the like, and on heavy-duty equipment. With this type there is generally a clevis at the end of the rigid tongue of the towed device which has aligned apertures that are aligned with an aperture on a towing bracket on the towing vehicle and a pin is inserted through the apertures. In using a pin type hitch there are certain disadvantages due to the fact that the tongue can only swing horizontally about the pivot pin but is held rigid in an upward and downward direction. This causes vertical forces to be transferred between the towed device and the towing vehicle, as for example, when going over bumpy roads, ridges, plowed fields and the like. Additionally, strains are placed on the tongue and many times the pins are broken.

The other general type of hitch is the ball and socket type which has a ball attached to the towing vehicle and a socket attached to the tongue of the towed device which fits over the ball and permits swivel movement of the tongue relative to the towing vehicle. This type of hitch is used with light trailers, such as boat trailers and the like. It has the advantage of the swivel connection but has the disadvantage that it cannot be used on heavy equipment since the tongue on heavy equipment cannot be lifted to place the socket over the ball.

Various other hitches are disclosed in the following patents which were found as the result of a preliminary search: U.S. Pat. No. 2,125,479; 2,668,723; and 3,542,400.

SUMMARY OF THE INVENTION

The present invention is directed towards overcoming the problems and disadvantages of prior hitches. It is a primary concept of the present invention to provide a hitch in which the tongue of the towed device, when the hitch is in the pin type mode of operation, can swing in universal movement so that it can adjust to any misalignment up and down as well as side to side of the towed device with the towing vehicle, and can be converted quickly and easily to the ball and socket type of hitch.

The means by which the above mentioned concept is accomplished is by providing a swivel assembly including a fixed and a movable portion including a tubular portion adapted to receive a pin therethrough, holder means engaging the movable portion for holding the movable portion in a fixed position, and ball and pin assembly means including a pin, a ball fixedly attached to the upper end of the pin which is adapted to receive the socket on the tongue of the towed device and nut means threaded on the lower end of the pin for clamping the holder means in a fixed position with the pin extending through the tubular portion and with the ball and nut means respectively engaging the opposite ends of the tubular portion. The pin and ball assembly means and the holder means are removable from the swivel assembly to convert the hitch into an improved pin type of hitch in which the tongue of the towed device is adapted to swivel relative to the towing vehicle.

Thus, one of the primary objects of the present invention is to provide a hitch which can be easily and quickly converted into an improved swivel pin type or a ball and socket type of hitch.

A further object is to provide such a hitch with which may be used portions of the original equipment, as the ball and pin assembly.

A further object is to provide such a hitch that is sealed against dirt, sand, and other foreign substances.

A further object is to provide such a hitch that is fully lubricated to reduce squeaking and excessive wear.

A further object is to provide such a hitch that the moving parts thereof can be quickly and easily replaced and without having to replace the whole unit.

A further object is to provide such a hitch which may be supported by a separate support bracket attached to the towing vehicle or supported directly from the towing vehicle as by providing a vertical hole through the horizontal portion of the bumper of the towing vehicle.

Other objects and advantages of the present invention will become apparent from a reading of the "-Description of the Preferred Embodiments" disclosed hereinafter.

DESCRIPTION OF THE PREFERRED EMBODIMENTS

Figure 1:
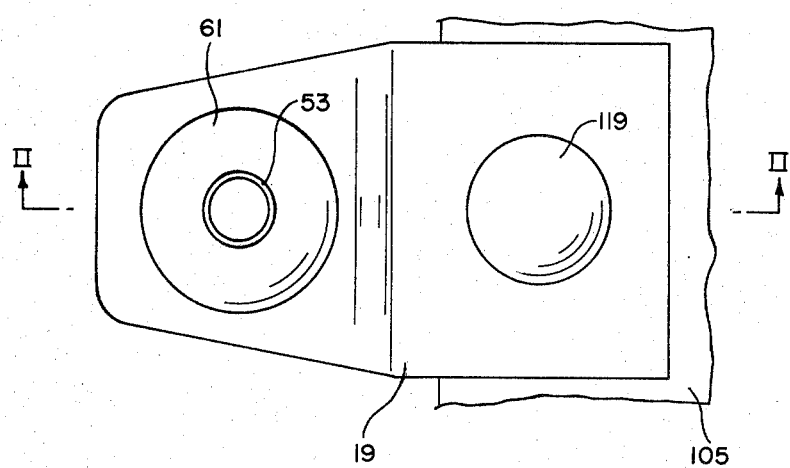
FIG. 1 is a plan view of the hitch of the present invention shown attached to the towing vehicle, with only a portion of the latter being shown.

The hitch 11 of the present invention comprises in general a swivel assembly 13, a holder 15, a ball and pin assembly 17, and support structure, as a support bracket 19. It will be understood that this support structure instead of being a separate piece may be an integral part of the towing vehicle, without departing from the spirit and scope of the present invention, as will be more apparent in the description to follow later.

Figure 2:
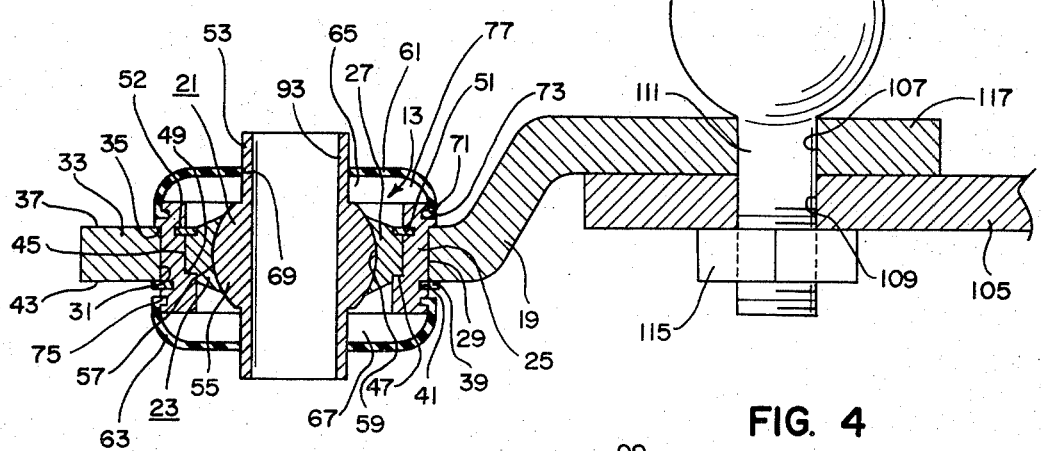
FIG. 2 is an enlarge sectional view taken as on the line II—II of FIG. 1.

Swivel assembly 13 includes in general an inner movable portion 21 and an outer fixed portion 23. Fixed portion 23 includes an outer ring 25 and an inner ring 27. The cylindrical outer surface 29 of outer ring 25 closely fits into a vertically extending hole 31 in support bracket 19 adjacent the rearward end 33 thereof. Outer ring 25 is provided on the outside thereof adjacent the upper end thereof with a downwardly facing shoulder 35 which engages the upper face 37 of support bracket 19 to limit downward movement of the outer ring 25, as best seen in FIG. 2. A suitable resilient snap lock ring 39 engages outer ring 25 in a groove 41 therein adjacent the lower end thereof opposite and spaced from shoulder 35. Lock ring 39 engages the lower face 43 of bracket 19 to removably retain outer ring 25 in hole 31.

The outer cylindrical surface 45 of inner ring 27 closely fits in the interior of outer ring 25, as best seen in FIG. 2. Shoulders 47, 49 are respectively provided on the outer surface of inner ring 27 and the inner surface of outer ring 25 adjacent the lower ends thereof. Shoulders 47, 49 respectively engage one another to limit downward movement of inner ring 27 relative to outer ring 25. A suitable resilient and removable snap lock ring 51 is provided in a groove 52 in the inner surface of outer ring 25 adjacent the upper end of the outer ring in spaced relationship above shoulders 47, 49. Lock ring 51 interacts between outer and inner rings 25, 27 limiting upward movement of inner ring 27 relative to outer ring 25 so that the inner ring 27 is removably retained in outer ring 25. It will be understood that inner and outer rings 27, 25 may be made of one piece integral construction without departing from the spirit and scope of the present invention.

Movable portion 21 includes a tubular portion 53 and a rounded portion 55 integrally formed around the tubular portion centrally thereof and intermediate the upper and lower ends thereof. The outer surface 57 of rounded portion 55 is in the shape of the outer surface of a section of a sphere. Outer surface 57 movably and slidably engages the inner surface 59 of inner ring 27, which is complementarily shaped relative to outer surface 57 so that the movable portion 21 is swivelly held relative to fixed portion 23. The tubular portion 53 extends generally vertically in spaced relationship above and below fixed portion 23 but may be tilted in any direction, that is, it has universal movement.

Upper and lower flexible cups 61, 63 are respectively interposed between movable and fixed portions 21, 23 adjacent the upper and lower ends of swivel assembly 13 to provide upper and lower enclosed chambers 65, 67. More specifically, upper cup 61 is annular in shape and preferably formed of neoprene. Upper cup 61 is provided with a central opening 69 which closely and tightly fits against tubular portion 53. The inturned outer edge 71 of upper cup 61 fits into a groove 73 provided adjacent the upper end of outer ring 25. Lower cup 63 is substantially identical in construction to upper cup 61 but fits around the lower portion of tubular portion 53 and into a groove 75 in the lower part of outer ring 25. Grease 77 is preferably provided in upper chamber 65 which works its way down between the rounded portion 55 and the inner surface 59 to keep the relatively moving parts properly lubricated.

Figure 3:
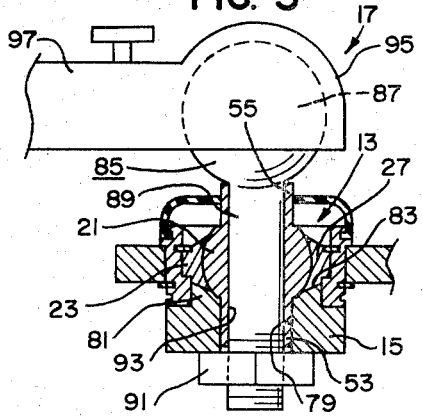
FIG. 3 is a view similar to a portion of that shown in FIG. 2 except that the device has been converted to the ball and socket type.

When the hitch 11 is converted to the ball and socket type of arrangement, as shown in FIG. 3, the lower cup 63 is removed and holder 15 is placed around the lower part of swivel assembly 13, as shown in FIG. 3. The holder 15 is annular and has a central bore 79 which closely fits over the lower end of tubular portion 53. Holder 15 has a reduced portion 81 at the upper end thereof which closely fits into the lower end of outer ring 25. The upper end of reduced portion 81 is preferably sloped as at 83 to conform to the lower surface of the inner ring 27. From the foregoing, it can be seen that when in the above described position, holder 15 will fixedly retain movable portion 21 in a fixed vertical position, as shown in FIG. 3. Holder 15 is retained in the above described position by the following means: A ball and pin assembly 85, which includes a spherical ball 87, a pin 89 fixedly attached to the ball and depending therefrom, and a nut 91 threadedly engaged on the threaded lower end pin 89, is assembled with swivel assembly 13 and holder 15. In the assembled relationship, ball 87 engages the upper end of tubular portion 53, pin 89 extends downwardly through bore 93 of tubular portion 53, and nut 91 engages the lower end of tubular portion 53 and the lower surface of holder 15 to retain the holder in position which in turn keeps movable portion 21 fixed relative to fixed portion 23. Therefore, ball 87 is retained fixed relative to movable portion 21, fixed portion 23, and support bracket 19 so that the ball may be utilized with a conventional socket 95 on the end of a tongue 97 which is a part of the towed device.

Figure 4:
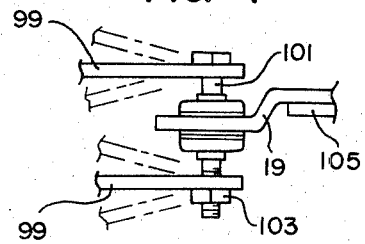
FIG. 4 is a side elevational view of the hitch of the present invention shown coupling a towed device to a towing vehicle by a pin, with portions of the tongue of the towed device and portions of the towing vehicle being shown and with various positions other than the horizontal position of the tongue of the towed device being shown in broken lines.

It will be understood that the ball 87 must be fixed relative to support bracket 19, as above described, in order for the device to properly function as a ball and socket type of arrangement since it would not operate properly if ball 87 were not secure. Also, it will be understood that to convert the hitch 11 from the ball and socket type to the pin type, it is only necessary to remove the ball and pin assembly 85 and the holder 15 so that the device shown to the left in FIG. 2 is obtained. Also, it is preferable that the lower cup 63 be put back into place. To use the hitch 11 as a pin type, it will be understood that the usual clevised tongue 99, as shown in FIG. 4, which has aligned apertures therethrough, is brought into place in alignment with bore 93. A pin 101 is placed through the aligned apertures in the tongue 99 and through the bore 93 and fastened therein by means of the nut 103. It will be understood that the tongue 99 will adjust to the uneven degree of tilt between the towed device and the towing vehicle, with various uneven degrees of tilt being shown in broken lines in FIG. 4. With this swivel arrangement there is little danger of breaking the pin 101.

As shown in FIG. 4, the bracket 19 may be welded to a portion 105 of the towed vehicle, which portion 105 is preferably a horizontal plate usually provided centrally of bumpers in pick-up trucks. However, portion 105 may be any other part of the towing vehicle without departing from the spirit and scope of the present invention. Also, it will be understood that hole 31 may be provided in portion 105 or other parts of the towing vehicle with the swivel assembly 13 being fitted therein. Another arrangement is shown in FIG. 2 in which it will be noted that instead of welding support bracket 19 to portion 105, aligned apertures 107, 109 are provided in support bracket 19 and portion 105. Then, the pin 111 of a ball and pin assembly 113 is passed through the aligned apertures 107, 109 and retained therein by the nut 115. The forward end 117 of support bracket 19 is offset upwardly from the rearward end 33 of the support bracket so that the forward end and ball 119 of the ball and pin assembly 113 is at a level spaced above the level of swivel assembly 13 whereby a trailer tongue having a socket thereon engaged on ball 119 will clear the swivel assembly during swinging movement of the trailer tongue thereabove.

With this arrangement, it is not necessary to utilize the ball and pin assembly 17 and holder 15 in the arrangement shown in FIG. 3 since the dual type is provided by the arrangement of FIG. 2, that is, both the pin type and the ball and socket type.

From the foregoing, it will be understood that the user may use his original equipment, as ball and pin assemblies 17, 113, in combination with the other related parts of the present invention. Also, if one part wears out, it is not necessary to replace the whole unit. For example, if inner ring 27 and movable portion 21 were to wear out, they could simply be replaced by removing snap lock 51 and replacing this assembly. On the other hand, if it is desired to replace swivel assembly 13, this may be quickly and easily done by removing snap lock 39 and replacing the assembly.

Although the invention has been described and illustrated with respect to preferred embodiments thereof, it is not to be so limited since changes and modifications may be made therein which are within the full intended scope of the invention.

I claim:

1. A hitch for hitching a towed device to a towing vehicle comprising a swivel assembly, support structure means supported by said towing vehicle for supporting said swivel assembly, said swivel assembly including a movable portion including a tubular portion and a rounded portion disposed around the outside of said tubular portion, a fixed portion mounted from said support structure and having an inner surface complementarily shaped relative to said rounded portion for swivelingly holding said rounded portion to permit universal swivel movement of said movable portion; holder means engaging said movable portion for holding said movable portion in a fixed position; ball and pin assembly means including a pin, a ball fixedly attached to the upper end of said pin and nut means threaded in the lower end of said pin for clamping said holder means in a fixed position with said pin extending through said tubular portion and said ball and nut means respectively engaging the opposite ends of said tubular portion and with said ball being adapted to be engaged by a socket device on a trailer tongue of a device for the towing thereof; said ball and pin assembly means and said holder means being removable from said swivel assembly to convert said hitch into a swivel pin type hitch adapted to be used with a pin extending through said tubular portion and apertures in the tongue of a device to be towed.

2. The hitch of claim 1 which includes upper and lower flexible cups respectively interposed between said fixed and said movable portions adjacent the upper and lower ends of said swivel assembly to provide upper and lower enclosed chambers, and with said upper chamber including a quantity of grease therein.

3. A hitch for hitching a towed device to a towing vehicle comprising a swivel assembly, support structure means for support by said towing vehicle to support said swivel assembly, said swivel assembly including a fixed portion and a movable portion including a tubular portion adapted to receive a pin therethrough for attaching a trailer tongue thereto to permit universal movement of said trailer tongue relative to said towing device, a ball adapted to receive a socket mounted on a trailer tongue for the towing thereof, means mounting said ball on said support structure means in spaced relationship forwardly of said swivel assembly and at a level spaced above the level of said swivel assembly so that a trailer tongue of a towed device having a socket thereon engaged on said ball will clear said swivel assembly during swinging movement of the trailer tongue thereabove.

4. The hitch of claim 3 in which said support structure means includes a bumper portion of the towing vehicle and includes a support plate having a horizontally extending forward portion and a horizontally extending rearward portion offset downwardly from said forward portion; and in which said forward portion and said bumper portion are in overlapping relationship and are provided with aligned apertures therethrough; and in which is said means mounting said ball on said support structure includes a pin attached to said ball and extending through said aligned apertures and a nut threadedly engaged on the lower end of said pin for clampingly holding said support plate and said bumper portion together.

5. The hitch of claim 3 in which said support structure means is provided with a vertically extending hole therethrough, and in which said fixed portion includes an outer ring and an inner ring, said outer ring extending through said hole, lock ring means removably retaining said outer ring in said hole, said inner ring being provided with an inner surface and being disposed concentrically in said outer ring and around said movable portion, and lock ring means removably retaining said inner ring in said outer ring.

* * * * *